Dec. 8, 1942.          T. O. DAVIDSON ET AL          2,304,075
                            BULLDOZER
              Filed Nov. 2, 1940          2 Sheets-Sheet 1

Trevor O. Davidson
Thomas R. Paulsen
INVENTORS.

BY Hearst Ruhloff
ATTORNEYS.

Dec. 8, 1942.  T. O. DAVIDSON ET AL  2,304,075
BULLDOZER
Filed Nov. 2, 1940  2 Sheets-Sheet 2

Trevor O. Davidson
Thomas R. Paulsen,
INVENTORS.

BY Hoar Puhloff

ATTORNEYS

Patented Dec. 8, 1942

2,304,075

UNITED STATES PATENT OFFICE 2,304,075

BULLDOZER

Trevor O. Davidson, Milwaukee, and Thomas R. Paulsen, South Milwaukee, Wis., assignors to Bucyrus-Erie Company, South Milwaukee, Wis., a corporation of Delaware Application November 2, 1940, Serial No. 364,010

5 Claims. (Cl. 37—144)

Our invention relates to new and useful improvements in tractor operated bulldozers, more particularly to the mounting of the hydraulic operating cylinders and the push arms thereof.

Heretofore such mountings, when attached to the traction frames have either been too rigid or too non-rigid, and have served to catch and hold much of the dirt which falls off of the upper reach of the link tracks, which dirt thus jams in the mechanism, thereby damaging it.

Accordingly the principal objects of our invention are to secure just the right combination of rigidity and flexibility, and to provide a sturdy mounting which will not catch and hold dirt.

In addition to our principal objects, above stated, we have worked out a number of novel and useful details, which will be readily evident as the description progresses.

Our invention consists in the novel parts and in the combination and arrangement thereof, which are defined in the appended claims, and of which one embodiment is exemplified in the accompanying drawings, which are hereinafter particularly described and explained.

Throughout the description, the same reference number is applied to the same member or to similar members.

Figures 1, 2, 3, 4:
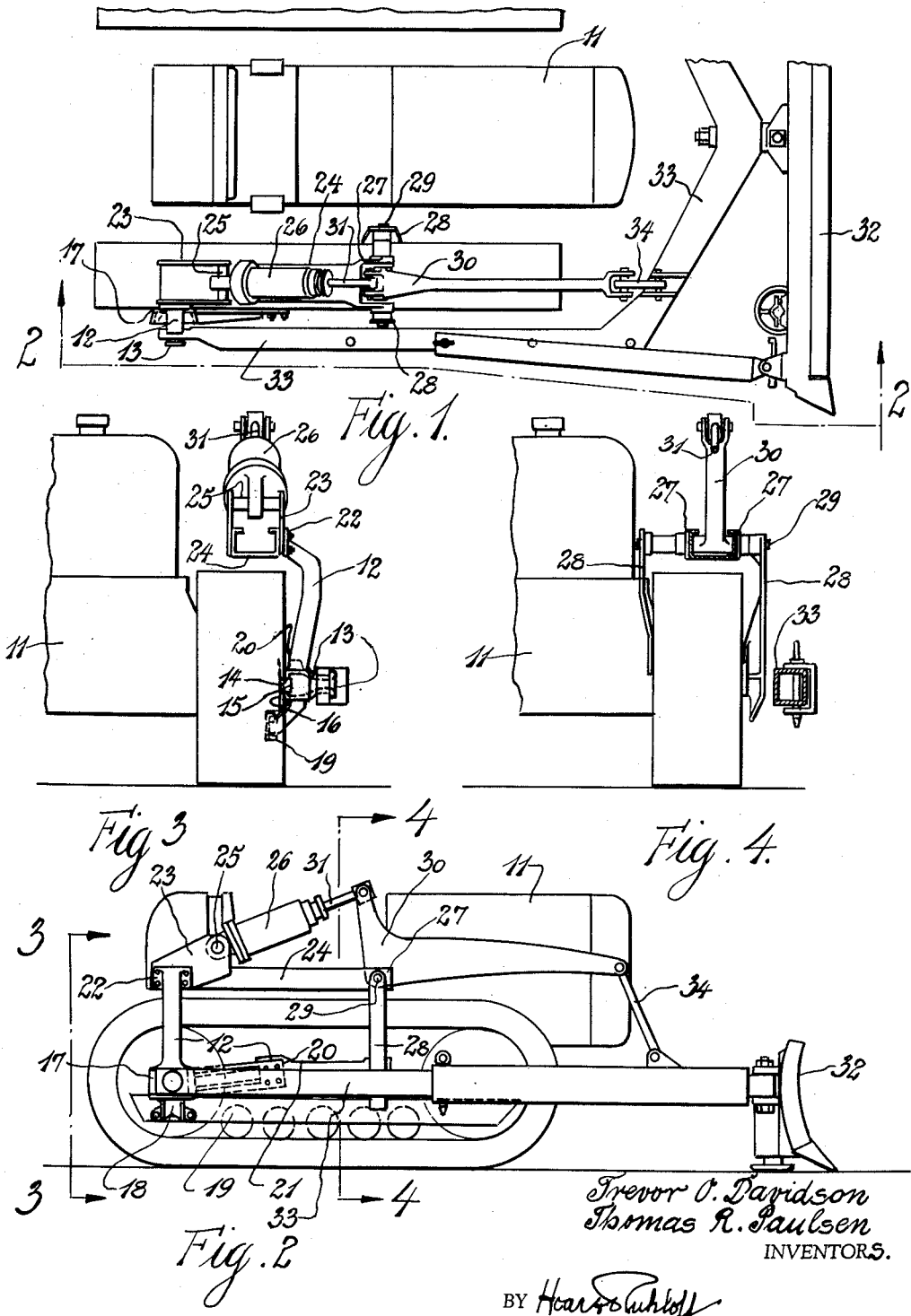
Figure 1 is a plan view of the right-hand half of our bulldozer, affixed to a tractor, the other half being symmetrical.
Figure 2 is a right side elevation thereof.
Figure 3 is a rear elevation of the rear support portion of our invention, taken along the line 3—3 of Figure 2.
Figure 4 is a rear elevation of the front support portion, taken along the lines 4—4 of Figure 2.
Figure 5:
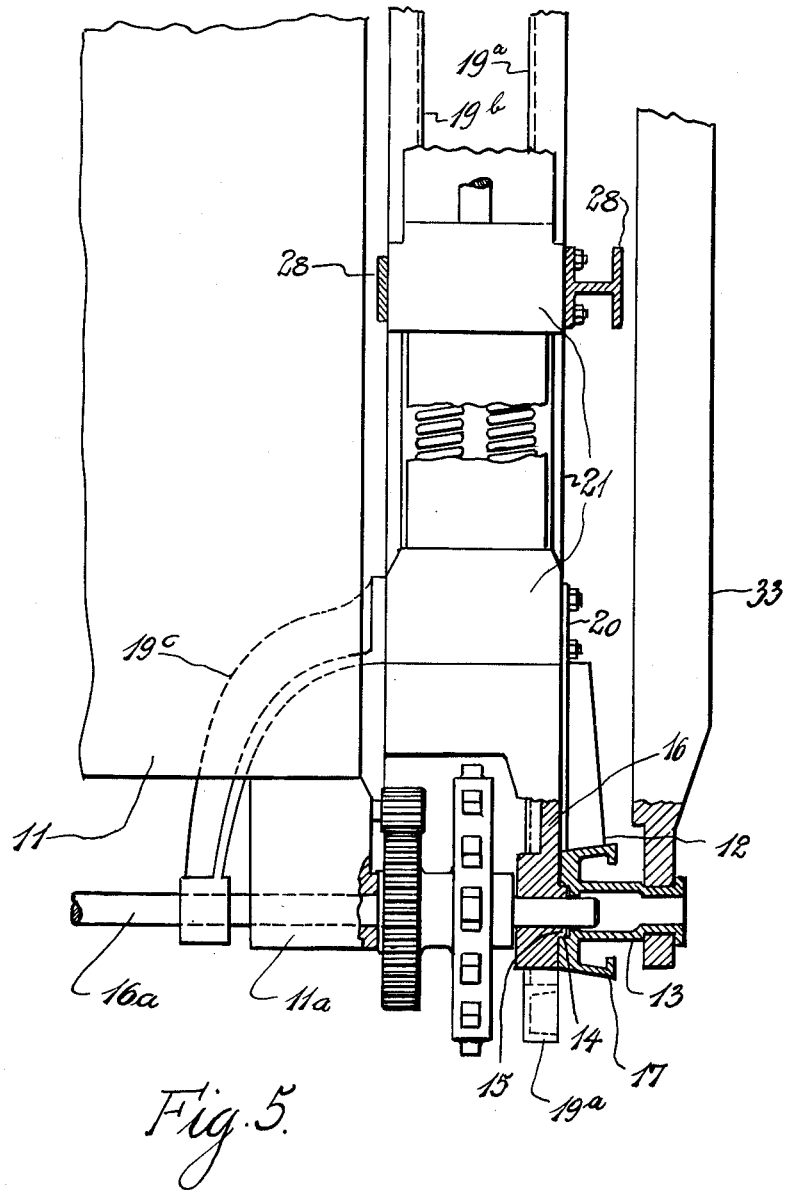
Figure 5 is a partial plan view showing the track frame of the tractor, the pivot axle shaft, the bracing of the track frame to the pivot shaft, and the lower portion of the L-shaped member to be more fully described hereinafter, taken substantially along the line 5—5 of Figures 2 and 3.

Referring now to these drawings, we see that 11 is a track-propelled tractor of any conventional design, the details of which do not constitute any part of our invention. But our invention, in its embodiment as shown and described herein, has specifically in mind the TD-18 tractor of the International Harvester Company. Referring to Figure 5, conventional details of this tractor pertinent to the cooperating elements of our bulldozer are: the main frame 11a, the pivot axle shaft 16a, and, on each side of the main frame 11a, a track frame which includes side roller-bearing beams 19a and 19b and a spring retainer 21, and is braced to the pivot axle shaft by the diagonal brace 19c. Other pertinent details will be referred to as the description progresses.

The principal element of our mounting is an L-shaped member 12. At the angle of the L is a hub 13, which contains a recess 14, to engage the boss 15 usually found on the housing 16 for the main pivot axle shaft 16a for the tracks of tractors such as are adapted to be used in connection with our bulldozer. This mounting of the L-shaped supporting member in line with the pivot shaft rather than at a less substantial part of the track frame is a part of our invention.

Extending fore and aft from the hub 13 are flanges 17, adapted to be bolted to said housing 16, as by bolts 17a.

The horizontal limb of the L is adapted at its end 20 to be bolted to a substantial point on the track frame, preferably in line with the interior diagonal brace 19c and the spring retaining member 21 between the outer and inner roller carrying side beams 19a and 19b of the track frame. This horizontal limb, so attached to the track frame, serves not only to resist torsional stresses imparted to it from the mounting of the hydraulic cylinder 26, and to brace the upright arm of the L against rotation about the pivot shaft 16a (rendering a dirt collecting diagonal brace unnecessary), but to reinforce the track frame along that portion of the track frame from which the inner side beam 19b has been cut away.

Extending downwardly from the hub 13, and curving inwardly, is a projection 18 adapted to be bolted to the outer beam 19a of the track frame. This downward projection 18, a part of our invention, serves both to aid the horizontal limb in its torsion resisting function, and also to reinforce, in combination with said horizontal limb of the L, the rear portion of the outer side beam 19a of the track frame.

A further feature of our invention is that the vertical limb of the L, being over the pivot axle shaft, is clear of the more forward center portion of the track frame and is thus unlikely to catch and hold dirt which falls off the track shoes, or to bring such accumulated dirt in contact with the rollers, damaging the traction mechanism.

The top 22 of the vertical limb of the L is adapted to be bolted to a cradle 23 and the rear end of a hollow beam 24. The cradle 23 may be a part of the hollow beam 24.

The hydraulic cylinder 26 is mounted on the cradle 23. The hollow beam 24 extends forward, substantially parallel to and above the horizontal limb of the L, and carries side-plates 27 projecting beyond its forward end.

Upstanding arms 28 are bolted, one inside and one out, to the forward portions of the track-frame, for example to the forward portion of the spring retainer 21. The tops of these arms 28 overlap the forward ends of the side-plates 27, but are not secured thereto. A pin 29 secured to the arms 28, passes pivotally through the side-plates 27, and pivotally supports the elbow of bell-crank 30.

The piston rod 31 of the cylinder 26 is pivotally attached to the upper (i. e. short) arm of the bell-crank 30.

A digging blade 32 is carried by push-arms 33, the rear ends of which are journalled to the hubs 13.

Link 34 is pivotally connected to the long arm of the bell-crank 30 and to the push arm 33.

All the assembly thus described for the right-hand side of the tractor is duplicated on the left-hand side.

The hydraulic cylinders 26, by pulling-in or pushing-out their pistons, can raise or lower the blade 32.

The hydraulic cylinders can be actuated by a pump (not shown) and control valves (not shown) carried by the tractor 11.

The traction-frames of a tractor are subject to some distortion, which would deleteriously strain the mounting of our cylinder and bell-crank, were it not for the flexible joint at the point of support of the elbow of our bell-crank. Yet the connections between our L-shaped member and the traction frame, and between our upstanding arms 28 and the traction frames has been found to be sufficiently rigid to support the cylinder and the bell-crank, without the use of diagonal, or other, cross-braces. Thus there is the minimum possibility of dirt collecting and damaging our supports or the traction mechanism.

Having now described and illustrated one form of our invention, we wish it to be understood that our invention is not to be limited to the specific form or arrangement of parts herein described and shown, except as specifically covered by our claims.

We claim:

1. In a bulldozer, for attachment to a track-type tractor, having a main engine frame, a pivot shaft extending laterally from each side of the rear of the engine frame, a track frame pivoted on each projecting pivot shaft end, said track frame being held against lateral movement by a diagonal brace extending from a portion of the track frame forward of the pivot shaft inwardly and rearwardly to engage the pivot shaft, and a housing carried by each track frame for the end of the pivot shaft, said housing having a lateral projection, the combination of: a transverse pusher blade; two push-arms extending rearwardly therefrom, and spaced to embrace the tractor; and, for attachment to each side of the tractor the following: an L-shaped member, having on its inner face adjacent the angle of the L a recess for engagement with the projection on the housing, and having means for securing the member to the housing, and having aligned with the pivot shaft a laterally outwardly extending hub, to which the rear end of the push-arm is pivotally attached, and having the substantially horizontal limb of the L extend forwardly for rigid attachment to the track frame adjacent the diagonal brace, and having a downward projection for attachment to the track frame below the pivot shaft; a cradle, carried by the upper limb of the L; two upwardly extending members, having means for rigid attachment to the track frame forward of the L, one inside and the other outside the track frame; a pivot extending across from the top of one of these upwardly extending members to the other; a substantially horizontal beam, rigidly attached to the upper limb of the L, and attached to the last mentioned pivot; an hydraulic cylinder, mounted in the cradle, and having a piston and piston-rod; and a bell-crank with its elbow pivoted on said pivot, and one of its arms pivotally attached to the piston-rod, and its other arm operatively connected to means to raise and lower the blade.

2. In a bulldozer, for attachment to a track-type tractor, having a main engine frame, a pivot shaft extending laterally from each side of the rear of the engine frame, a track frame pivoted on each projecting pivot shaft end, said track frame being held against lateral movement by a diagonal brace extending from a portion of the track frame forward of the pivot shaft inwardly and rearwardly to engage the pivot shaft, the combination of: a transverse pusher blade; two push-arms extending rearwardly therefrom, and spaced to embrace the tractor; and, for attachment to each side of the tractor the following: an L-shaped member, adapted to be attached adjacent the angle of the L to the tractor adjacent the end of the pivot shaft, and having a laterally outwardly extending hub, to which the rear end of the push-arm is pivotally attached, and having the substantially horizontal limb of the L extend forwardly for rigid attachment to the track frame adjacent the diagonal brace, and having a downward projection for attachment to the track frame below the pivot shaft; two upwardly extending members, having means for rigid attachment to the track frame forward of the L, one inside and the other outside the track frame; a substantially horizontal beam, rigidly attached to the upper limb of the L, and supported by the upwardly extending members; and hydraulic means, supported by the L and by the upwardly extending members, and having an operative connection with the blade to raise and lower the blade.

3. In a bulldozer-attaching frame, for attachment to a track-type tractor, having a main engine frame, a pivot shaft extending laterally from each side of the rear of the engine frame, a track frame pivoted on each projecting pivot shaft end, said track frame being held against lateral movement by a diagonal brace extending from a portion of the track frame forward of the pivot shaft inwardly and rearwardly to engage the pivot shaft, the combination of: an L-shaped member, adapted to be attached adjacent the angle of the L to the tractor adjacent the end of the pivot shaft, and having a laterally outwardly extending hub, and having the substantially horizontal limb of the L extend forwardly for rigid attachment to the track frame adjacent the diagonal brace, and having a downward projection for attachment to the track frame below the pivot shaft; a cradle, carried by the upper limb of the L; two upwardly extending members, having means for rigid attachment to the track frame forward of the L, one inside and the other outside the track frame; a pivot extending across from the top of one of these upwardly extending members to the other; a substantially horizontal beam, rigidly attached to the upper limb of the L, and supported by the upwardly extending members.

4. In a bulldozer-attaching frame, for attachment to a track-type tractor, having a main engine frame, a pivot shaft extending laterally from each side of the rear of the engine frame, a track frame pivoted on each projecting pivot shaft end, said track frame being held against lateral movement by a diagonal brace extending from a portion of the track frame forward of the pivot shaft inwardly and rearwardly to engage the pivot shaft, the combination of: an L-shaped member, adapted to be attached adjacent the angle of the L to the tractor adjacent the end of the pivot shaft, and having the substantially horizontal limb of the L extend forwardly for rigid attachment to the track frame adjacent the diagonal brace, and having a downward projection for attachment to the track frame below the pivot shaft; two upwardly extending members, having means for rigid attachment to the track frame forward of the L, one inside and the other outside the track frame; a pivot extending across from the top of one of these upwardly extending members to the other; a substantially horizontal beam, rigidly attached to the upper limb of the L, and supported by the upwardly extending members.

5. In a bulldozer-attaching frame, for attachment to a track-type tractor, having a main engine frame, a pivot shaft extending laterally from each side of the rear of the engine frame, a track frame pivoted on each projecting pivot shaft end, said track frame being held against lateral movement by a diagonal brace extending from a portion of the track frame forward of the pivot shaft inwardly and rearwardly to engage the pivot shaft, the combination of: an L-shaped member, adapted to be attached adjacent the angle of the L to the tractor adjacent the end of the pivot shaft, and having the substantially horizontal limb of the L extend forwardly for rigid attachment to the track frame adjacent the diagonal brace, and having a downward projection for attachment to the track frame below the pivot shaft; upwardly extending means, having means for rigid attachment to the track frame forward of the L; a pivot supported by the upwardly extending means; a substantially horizontal beam, rigidly attached to the upper limb of the L, and supported by the upwardly extending means.

THOMAS R. PAULSEN.
TREVOR O. DAVIDSON.